United States Patent [19]

Micic et al.

[11] Patent Number: 4,872,060

[45] Date of Patent: Oct. 3, 1989

[54] DIGITAL CIRCUIT SYSTEM FOR TELEVISION RECEIVERS WITH CATHODE RAY PICTURE TUBES

[75] Inventors: Ljubomir Micic, Freiburg; Soenke Mehrgardt, March, both of Fed. Rep. of Germany

[73] Assignee: Deutsche ITT Industries, GmbH, Freiburg, Fed. Rep. of Germany

[21] Appl. No.: 283,031

[22] Filed: Dec. 5, 1988

Related U.S. Application Data

[63] Continuation of Ser. No. 48,114, May 11, 1987, abandoned.

[30] Foreign Application Priority Data

May 17, 1986 [EP] European Pat. Off. ........ 86106771.8

[51] Int. Cl.⁴ .............................................. H04N 5/68
[52] U.S. Cl. .................................... 358/242; 315/371
[58] Field of Search ............... 358/242, 140, 243, 160, 358/139, 137, 134; 340/736; 315/371, 370, 367, 383

[56] References Cited

U.S. PATENT DOCUMENTS

| | | | |
|---|---|---|---|
| 4,047,204 | 9/1977 | Gold | 358/242 X |
| 4,130,834 | 12/1978 | Mender et al. | 358/134 X |
| 4,386,349 | 5/1983 | Granberg et al. | 340/736 X |
| 4,573,080 | 2/1986 | Maze | 358/242 x |
| 4,689,526 | 8/1987 | Schweer | 315/371 |
| 4,695,772 | 9/1987 | Lau et al. | 358/242 X |

FOREIGN PATENT DOCUMENTS

| | | |
|---|---|---|
| 0162123 | 11/1985 | European Pat. Off. . |
| 2505953 | 8/1975 | Fed. Rep. of Germany ...... 358/141 |
| 2808224 | 9/1979 | Fed. Rep. of Germany . |
| 3136029 | 3/1983 | Fed. Rep. of Germany . |

OTHER PUBLICATIONS

Electronic Engineering 56 (1984) May, No. 689, London, G. Britain, pp. 77–80, "Deflection Processor Eliminating TV Hold Controls".

IEEE Transaction on Consumer Electronics, CE-31 (1985) Aug., No. 3, New York, pp. 255–261, "Symmetric Line Deflection for Color TV Receivers with Enhanced Picture Quality", Uwe E. Kraus.

*Primary Examiner*—James J. Groody
*Assistant Examiner*—Victor R. Kostak
*Attorney, Agent, or Firm*—Thomas L. Peterson

[57] ABSTRACT

A deflection processor generates deflection signals such that the video information of the received signal is visible on the picture tube screen during all movements of the cathode ray beam. The video signal, after being digitized by means of a clock signal, is written into a random-access memory and is read therefrom in such a way that the individual pixels occupy the correct positions on the screen. This is done under control of a memory controller. The digital signals of the memory are applied to a tube-error-compensating stage and to the picture tube via digital-to-analog converters. This arrangement eliminates the rigid dependence on sawtooth deflection signals and permits the waveforms of the deflection signals to be freely selected according to requirements.

4 Claims, 3 Drawing Sheets

DIGITAL CIRCUIT SYSTEM FOR TELEVISION RECEIVERS WITH CATHODE RAY PICTURE TUBES

This is a continuation of application Ser. No. 048,114 filed May 11, 1987 now abandoned.

BACKGROUND OF THE INVENTION

During the past few years, digital circuit technology has come into se in television receivers, including color television receivers, for processing the received signal and for generating the deflection signal required to control the movement of the electron beam. During the research for and the development and implementation of these digital circuit systems, the course traced ou by conventional analog signal processing was followed, and the known individual problems were solved by means of digital rather than analog circuits.

By contrast, the present invention is predicated on the realization that, against the background of digital signal processing in television receivers, the constraints resulting from conventional analog technology, particularly with respect to predetermined signal waveforms, can be eliminated, thus making it possible to cope with difficult problems better than with conventional analog and/or digital technology. One of those difficult problems is still the geometric distortions introduced by the nonspherical curvature of the tube screen during reproduction. To eliminate these distortions, a considerable amount of circuitry is required both with conventional analog technology and more recent digital technology; an example is the great number of pincushion-correcting circuits.

SUMMARY OF THE INVENTION

The fundamental idea of the invention as claimed is to abandon the rigid dependence on the commonly used sawtooth signal for ohorizontal deflection and vertical deflection, which both have a very short retrace period in comparison with the trace period, and to make the individual pixels of the video signal visible on the screen when the two deflection signals have moved the electron beam to the point intended on the transmitter side.

In the present invention, therefore, the deflection signals are no longer generated by a sawtooth generator of long-known analog or more recent digital design, but a deflection processor is provided which generates horizontal and vertical deflection signals with freely selectable waveforms.

The video signal, after being digitized by means of a clock signal, is written into a random-access memory and is read ou in such a way that the individual pixels occupy the intended positions on the screen. The memory has a suitable controller associated therewith, of course. The digital signals read out of the memory must be applied to a compensating stage for correcting picture tube errors before they drive the picture tube via digital-to-analog converters.

BRIEF DESCRIPTION OF THE DRAWINGS

The invention will now be explained in greater detail with reference to the accompanying drawing, in which.

DETAILED DESCRIPTION OF SEVERAL PREFERRED EMBODIMENTS

Figure 1:
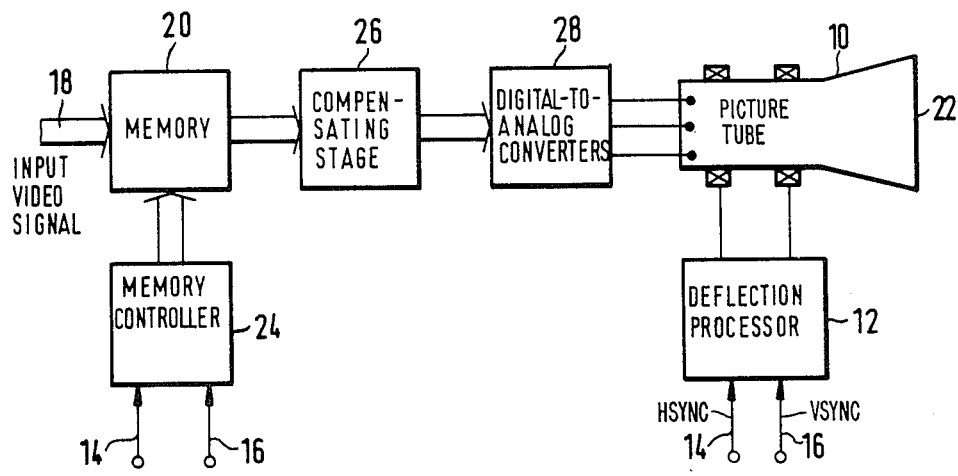
FIG. 1 is a highly schematic block diagram of an embodiment of the invention.

In the schematic circuit diagram of FIG. 1, the horizontal and vertical deflection systems of a picture tube 10 are fed, respectively, with the horizontal and vertical deflection signals generated by a deflection processor 12 in the above sense. To generate these signals, the deflection processor 12 needs horizontal and vertical synchronizing signals 14, 16, respectively, which are derived by a conventional sync separator, which may, of course, be implemented as a digital circuit, too, from the received and demodulated composite color signal in the usual manner. The video signal 18, after being digitized by means of a clock signal, is written into a random-access memory 20, which is capable of storing at least one line and/or at least one field. These stored video signals are then read out of the memory 20 in such a wah that the individual pixels occupy the intended positions on a picture tube screen 22, as mentioned above. Both the write-in and the read-out are performed under control of a memory controller 24, which, like the deflection processor 12, is fed with the horizontal and vertical synchronizing signals 14, 16.

The memory 20 is followed by a compensating stage 26 for correctign picture tube errors, and the picture tube 10 is driven with the correct video signals via digital-to-analog converters 28.

Figure 2:
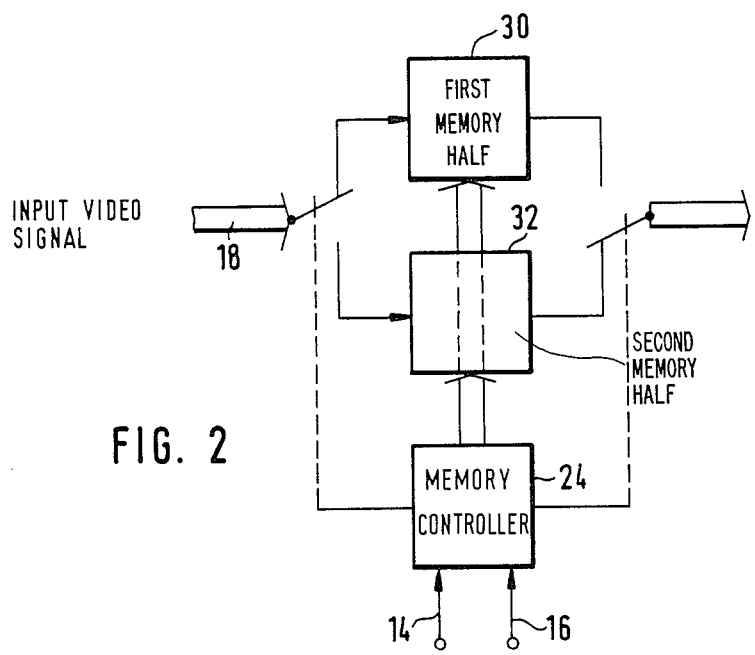
FIG. 2 shows a preferred embodiment of a portion of the circuit of FIG. 1.
Figure 3:
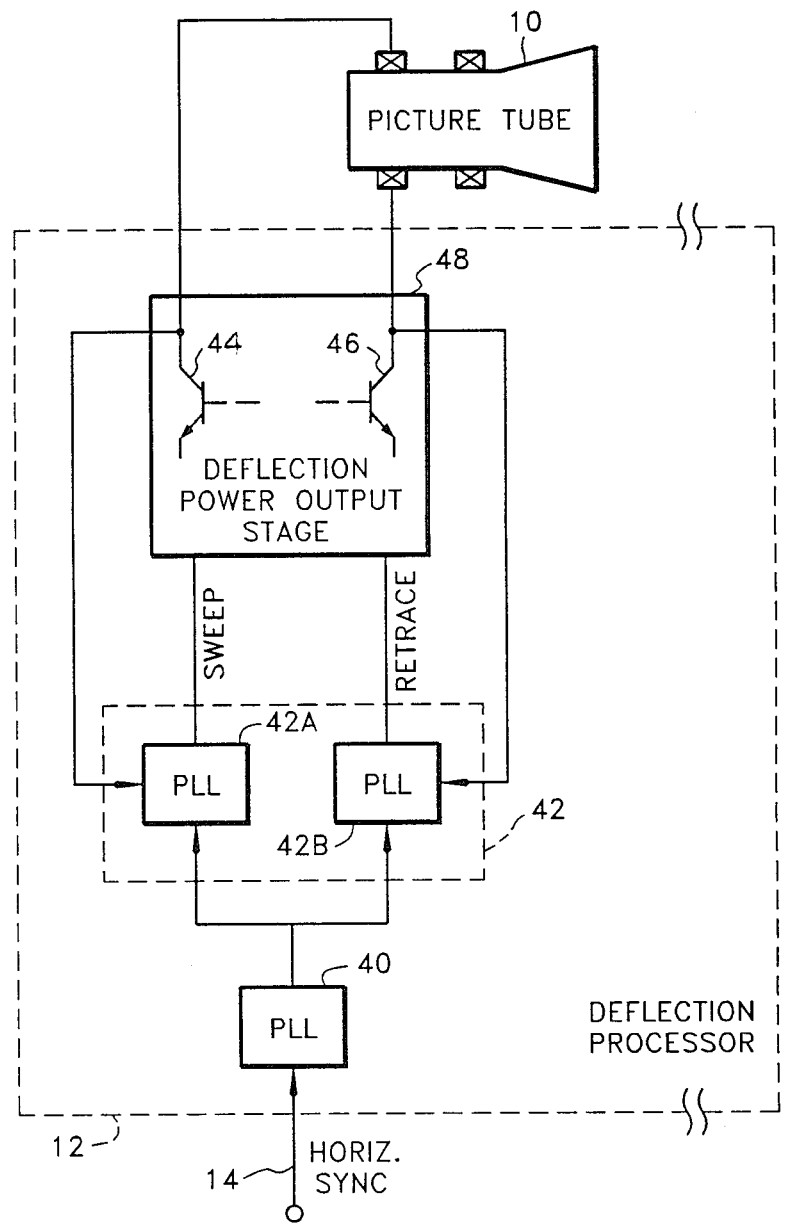
FIG. 3 shows a preferred embodiment of a portion of the deflection processor of FIG. 1, showing the phase-locked loops therein.
Figure 4:
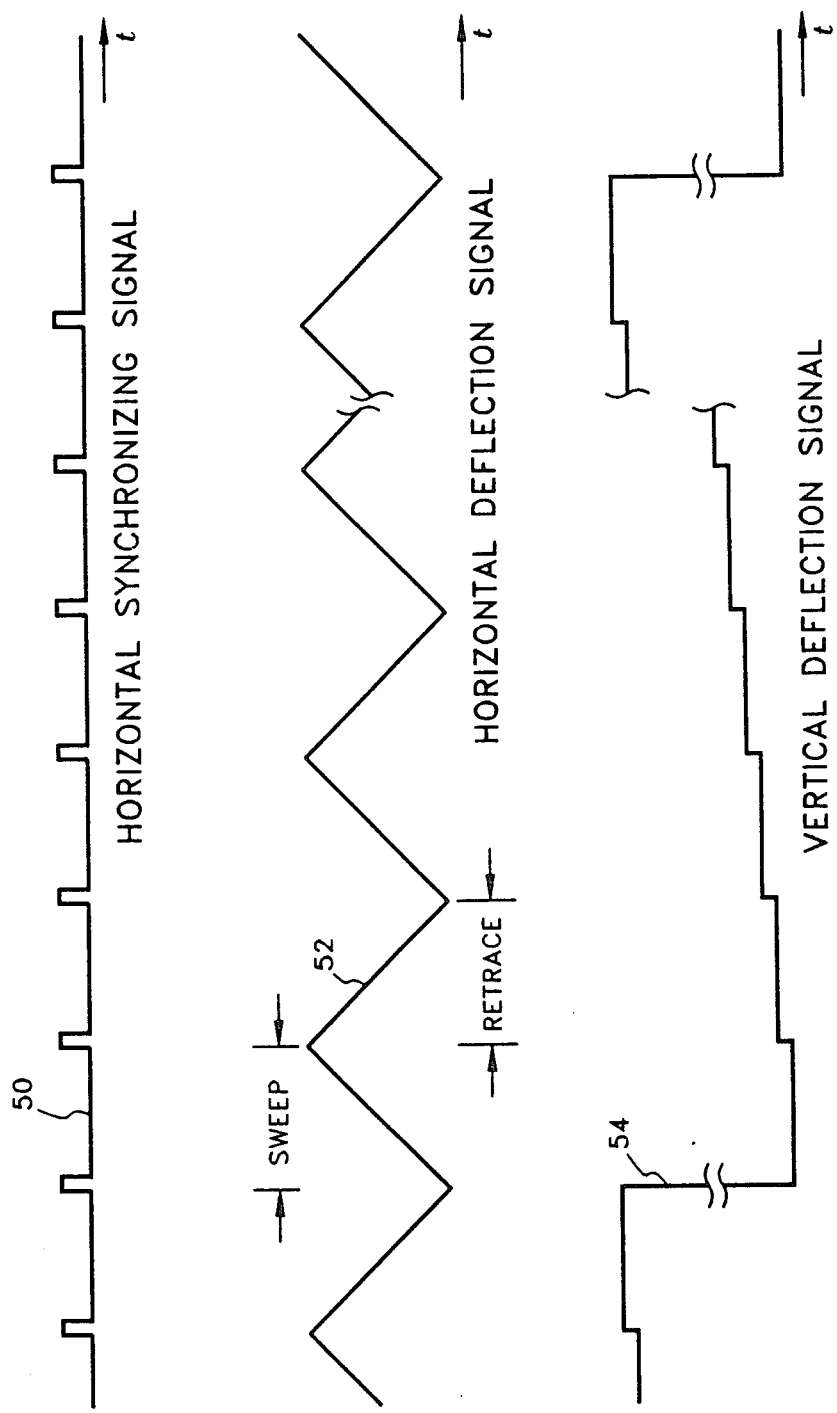
FIG. 4 illustrates graphs of exemplary signal waveforms associated with the deflection processor of FIG. 3.

In a preferred embodiment of the invention, the signals are read from the memory 20 in the same order as that in which they were written in, i.e., forward, so to speak, during the trace period, and in reverse order, i.e. backward, so to speak, during the retrace period. This may apply to the individual lines of the screen picture, for example; then the memory 20 must have locations for at least two lines. It may also be the case for fields, however; then the memory 20 must be capable of storing at least two fields. As illustrated in FIGS. 3 and 4, when the embodiment just explained is used in television receivers, including color television receivers, with a deflection processor 12 (FIG. 3) which has two phase-locked loops (PLL) 40, 42 the first 40 of which synchronizes with the transmitted horizontal synchronizing signal 50 (FIG. 4) and the second 42 with the flyback signal, and if the horizontal deflection signals are triangular signals 52 whose frequency is half the input horizontal frequency, as shown in FIG. 4, with the vertical deflection signals 54 being sawtooth signals stepped line by line, in another preferred embodiment of the invention, the random-access memory 20 consists of two halves 30, 32, each for the video signals of one of two successive lines. During the horizontal trace interval, thte video signals stored in the first half 30 of the memory 20 during the preceding horizontal retrace interval are read out forward at the write-in rate, and during the horizontal retrace interval, the video signals stored in the second half 32 of the memory 20 during the preceding horizontal trace interval are read out backward at the write-in rate. This is indicated in FIG. 2 by means of the two switches to be operated by the memory controller 24 in a suitable manner.

In this preferred embodiment, the above-menttioned second phase-locked loop is duplicated, one loop 42A being provided for the deflection signal for horizontal sweep, and the other 42B for that for horizontal retrace. Each of these two second phase-locked loops is supplied with a separate flyback signal. These flyback signals are derived from the switching delays of two transistors 44, 46 to be cut off on the "right" and "left" reversals of the direction of deflection, respectively. These transistors 44, 46 are the usual output transistors 44, 46 of the deflection power output stage 48, which are operated in the base saturation region during the flow of current, as is well known, so that, on a change to the off state, they switch the input cut-off signal to the output not immediately, but only when the excess charge carriers stored in the base region during the saturated condition have been removed.

The preferred embodiment just mentioned can be modified so as to make the frequency of the triangular signals equal to the input horizontal frequency. Then, in a received odd line, the video signals stored in the first half 30 of the memory during the preceding line are read out first forward and immediately thereafter backward at twice the write-in rate. Furthermore, ina received even line, the video signals stored inthe second half 32 of the memory during the preceding line are read out first forward and immediately thereafter backward at twice the write-in rate. Here, too, the second phase-locked loop must be duplicated, and each of the two loops must be fed with a separate flyback signal as mentioned above.

The individual subcircuits of the invention are implemented with digital integrated circuits, of course, preferably with MOS circuits.

What is claimed is:

1. A digital circuit system for a television receiver with a cathode-ray tube for converting a received video signal to images on the picture tube, comprising:
    a deflection processor for generating deflection signals such that the video information of the received signal is displayed on the screen of the picture tube during both the sweep and retrace movements of the cathode-ray beam;
    a random-access memory for storing either at least one line or at least one field of the video signal digitized to form digital signals by means of a clock signal, the randomaccess memory being under control of a memory controller, the digital signals being read from the random-access memory so that the individual pixels occupy the positions on the screen of the picture which are intended on the transmitter side; and
    a compensating stage coupled to receive the digital signals from the random-access memory for correcting picture tube errors caused by the non-spherical curvature of the picture tube screen, the compensating stage driving the picture tube via a digital-to-analog converter.

2. A digital circuit system as claimed in claim 1, wherein the digital signals are read from the random-access memory in the order of write-in during the trace period and in reverse order during the retrace period.

3. A digital circuit system for a television receiver with a cathode-ray picture tube for converting a received video signal to images on the picture tube, comprising:
    a deflection processor for generating deflection signals such that the video information of the received signal is displayed on the screen of the picture tube during both the sweep and retrace movements of the cathode-ray beam, wherein:
        the deflection processor comprises a first phase-locked locked loop which synchronizes with the transmitted horizontal synchronizing signal and a second phase-locked loop which synchronizes with the flyback signal; and
        the horizontal deflection signals are triangular signals whose frequency is equal to half the input horizontal frequency and the vertical deflection signals are sawtooth signals stepped line by line;
    a random-access memory for storing either at least one line or at least one field of the video signal digitized to form digital signals by means of a clock signal, the randomaccess memory being under control of a memory controller, the digital signals being read from the random-access memory so that the individual pixels occupy the positions on the screen of the picture tube which are intended on the transmitter side, wherein:
    the random-access memory has a first half and a second half, each half for the video signals of one of two successive lines;
        during a horizontal trace period, the video signals stored inthe first half of the memory during the preceding horizontal retrace period are read out forward at the write-in rate;
        during a horizontal retrace period, the video signals stored in the second half of the memory during the preceding horizontal trace period are read out backward at the write-in rate; and
        the second phase-locked loop comprises first and second loop portions, said first loop portion being provided for horizontal sweep and said second loop portion being provided for horizontal retrace, the flyback signal for each of the first and second loop portions being a signal derived from the switching delay of a transistor to be cut off on the reversal of the direction of deflection; and
    a compensating stage coupled to receive the digital signals from the random-access memor for correcting picture tube errors caused by the non-spherical curvature of the picture tube screen, the compensating stage driving the picture tube via a digital-to-analog converter.

4. A digital circuit system for a television receiver with a cathode-ray picture tube for converting a received video signal to images on the picture tube, comprising:
    a deflection processor for generating deflection signals such that the video information of the received signal is displayed on the screen of the picture tube during both the sweep and retrace movements of the cathode-ray beam, wherein:
        the deflection processor comprises a first phase-locked locked loop which synchronizes with the transmitted horizontal synchronizing signal and a second phase-locked loop which synchronizes with the flyback signal;
        the horizontal deflection signals are triangular signals whose frequency is equal to the input horizontal frequency and the vertical deflection signals are sawtooth signals stepped line by line;
    a random-access memory for storing either at least one line or at least one field of the video signal digitized to form digital signals by means of a clock signal, the randomaccess memory being under control of a memory controller, the digital signals being read from the random-access memory so that the individual pixels occupy the positions on the screen of the picture tube which are intended on the transmitter side, wherein:

the random-access memor has a first half and a second half, each half for the video signals of one of two successive lines;

during areceived odd line, the video signals stored in the first half of the memory during the preceding line are read out forward and subsequently backward at twice the write-in rate;

during a received even line, the video signals stored in the second half of the memory during the preceding line are read out forward and subsequently backward at twice the write-in rate; and said second phase-locked loop comprises first and second loop portions, said first loop portion for horizontal sweep and said second loop portion for horizontal retrace, the flyback signal for each of the first and second loop portions being a signal derived from the switching delay of a transistor to be cut off on the reversal of the direction of deflection; and a compensating stage coupled to receive the digital signals from the random-access memory for correcting picture tube errors caused by the nonspherical curvature of the picture tube screen, the compensating stage driving the picture tube via a digital-to-analog converter.

* * * * *